Oct. 30, 1945. J. RODWAY 2,388,185
STEERING MECHANISM FOR VEHICLES
Filed Nov. 2, 1943 4 Sheets-Sheet 1

Inventor
John Rodway
By
Attorneys

Patented Oct. 30, 1945

2,388,185

UNITED STATES PATENT OFFICE 2,388,185

STEERING MECHANISM FOR VEHICLES

John Rodway, Lincoln, England

Application November 2, 1943, Serial No. 508,768
In Great Britain June 22, 1942

7 Claims. (Cl. 180—79.2)

This invention relates to power actuated steering mechanism and has for its object to provide an improved construction or arrangement designed to reduce the manual effort required in the steering of heavy vehicles and also to reduce the shock at the hand steering wheel due to the impact on the road wheels when traversing uneven ground.

According to the invention, a power operated steering device for vehicles is provided, wherein the manual effort is transmitted from a steering wheel to a system of pivoted levers through which valve mechanism controlling a power cylinder is operated, a piston in said cylinder being also connected to the said lever system, one component of which is connected to the steering gear of the road wheels.

According to one form of the invention a power operated steering device for vehicles is provided wherein the manual effort is transmitted from a steering wheel to a lever whose rotary movement is restricted, the said lever being connected to means for operating either of two valve systems controlling the application of pressure or vacuum to the ends of a power cylinder, the piston in which is also connected to said lever whose movement received from said piston is transmitted through output mechanism to the steering gear of the road wheels.

According to the preferred form of the invention a power operated steering device for vehicles includes concentric input and output shafts carrying arms pivotally connected at different points to a lever, one end of said lever freely surrounding the inner shaft and having a connection to control valve devices and the other end of said lever having a connection to the piston of a power cylinder, the rocking movement imparted to said lever by operation of the input shaft causing said lever to operate one of said valve devices whereby power is developed in said cylinder which reacts on the said lever to balance it about its pivotal connection to the output arm and cause movement to be transmitted through said arm to the output shaft and the steering gear.

Reference will now be made to the accompanying drawings which illustrate a power actuated steering mechanism constructed according to the invention and in which.

Figure 1:
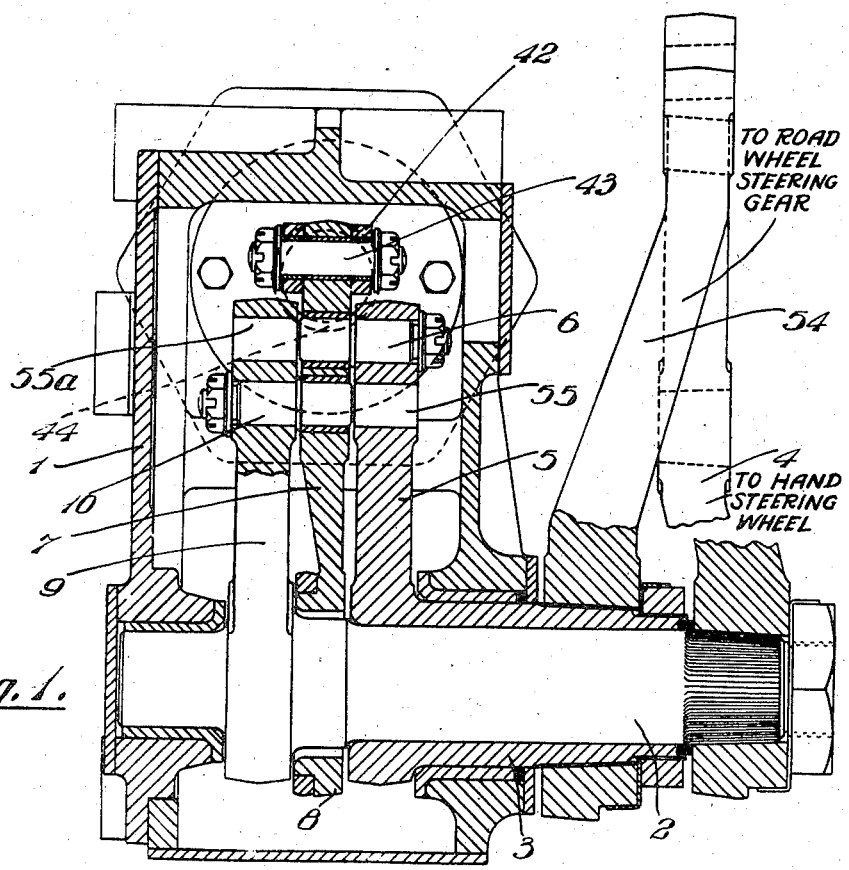
Fig. 1 is an elevation showing the input and output mechanism.

In the construction illustrated, the power actuated steering unit comprises a casing 1 from one side of which project the ends of two concentrically arranged shafts 2 and 3.

The inner shaft 2 constitutes the input shaft and carries an arm 4 at its outer end which is connected to the hand operated steering wheel of the vehicle. The outer shaft 3 is in the form of a sleeve and constitutes the output shaft, its movement being transmitted through an arm 54 carried at its outer end to the steering gear of the road wheels.

The inner end of the shaft 3 is formed integral with an arm 5 which is mounted over a pin 6 on which is also pivoted a lever 7 whose rotary movement is limited by forming it at one end with an annulus 8 loosely surrounding the inner end of the shaft 2. This shaft 2 also carries at its inner end an arm 9 pivotally mounted by means of a pin 10 to the lever 7 at a point eccentric to the pin 6. The annulus 8 is connected by means of a rod 11 to a rocking lever 12 movable about a fixed pivot 13. The rod 11 passes through a central aperture in a flexible washer 14 which seals the aperture 15 in the casing 1 through which the rod 11 passes and the rod also carries two flanged collars 16 and 17 mounted within a small casing 18 fixed to the casing 1. The flanged collars 16 and 17 are urged apart by a bias spring 19 and are movably mounted on the rod 11, their movement being restricted by engagement with a shoulder 20 and washer 21 respectively on the rod 11 and by engagement with the end walls of the casing 18 with which the flanged collars are both engaged when the device is in the rest position shown in Fig. 2.

The end of the rocking lever 12 remote from rod 11 is situated between a pair of tappets 22 and 23 connected to hollow ported rods 24 and 25 movable axially in valve housings 26 and 27. The inner ends of the hollow ported rods 24 and 25 are adapted respectively to engage seatings 28 and 29 carried at the ends of valve stems 30 and 31 which are formed at their opposite ends with mushroom heads 32 and 33 adapted to cooperate with seatings 34 and 35 formed within the valve housings to control the flow of pressure fluid through ports 36 and 37 or 38 and 39 to a power cylinder 40 which is secured to the housing 1 and has a piston 41 connected by a rod 42 to the upper end of the lever 7 at 43. The piston 41 carries a cylindrical sleeve 44 slidably mounted in a cup washer 45 at one end of cylinder 40 and of such diameter as to permit angular movements of the rod 42 when the piston 41 is moved towards either end of its cylinder as hereinafter described.

Figure 4:
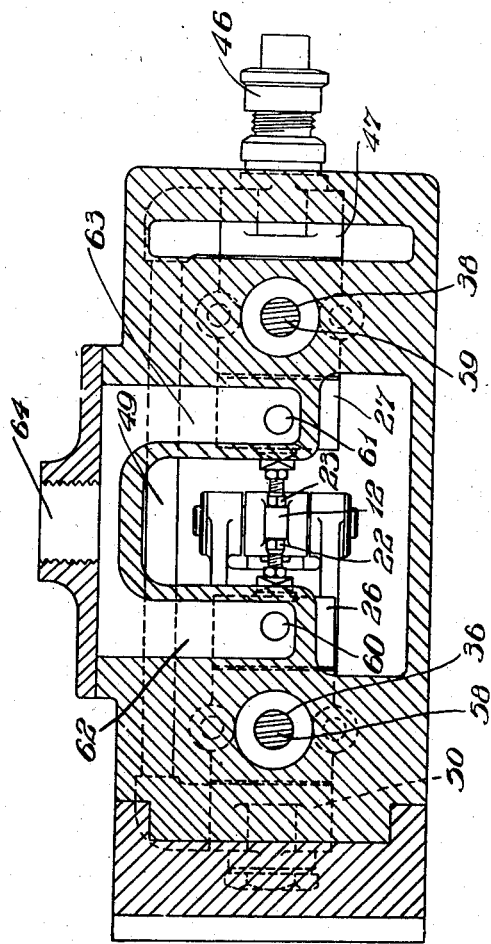

The pressure fluid is admitted through an inlet 46 to a valve chamber 47 attached to housing 27 and in which chamber the valve member 33 is movable against the action of a spring 48. The valve chamber 47 is connected by a pipe 49 with an opposed valve chamber 50 attached to housing 26 and in which the valve member 32 is movable against the action of a spring 51. The valve stems 30 and 31 are slidable in ported sleeves 52 and 53 formed integral with the valve chambers 47 and 50 respectively. Between these valve chambers and flanges 56 and 57 on the hollow ported rods 24 and 25 are disposed springs 58 and 59 which act as return springs by separating the end of the tappet rod 22 or 23 from its seating 28 or 29 when the pressure of the lever 12 is removed, to return it to neutral position. The housings 26 and 27 are provided with exhaust ports 60 and 61 which, as shown in Fig. 4, communicate by passages 62 and 63 with a common exhaust outlet 64.

Figure 2:
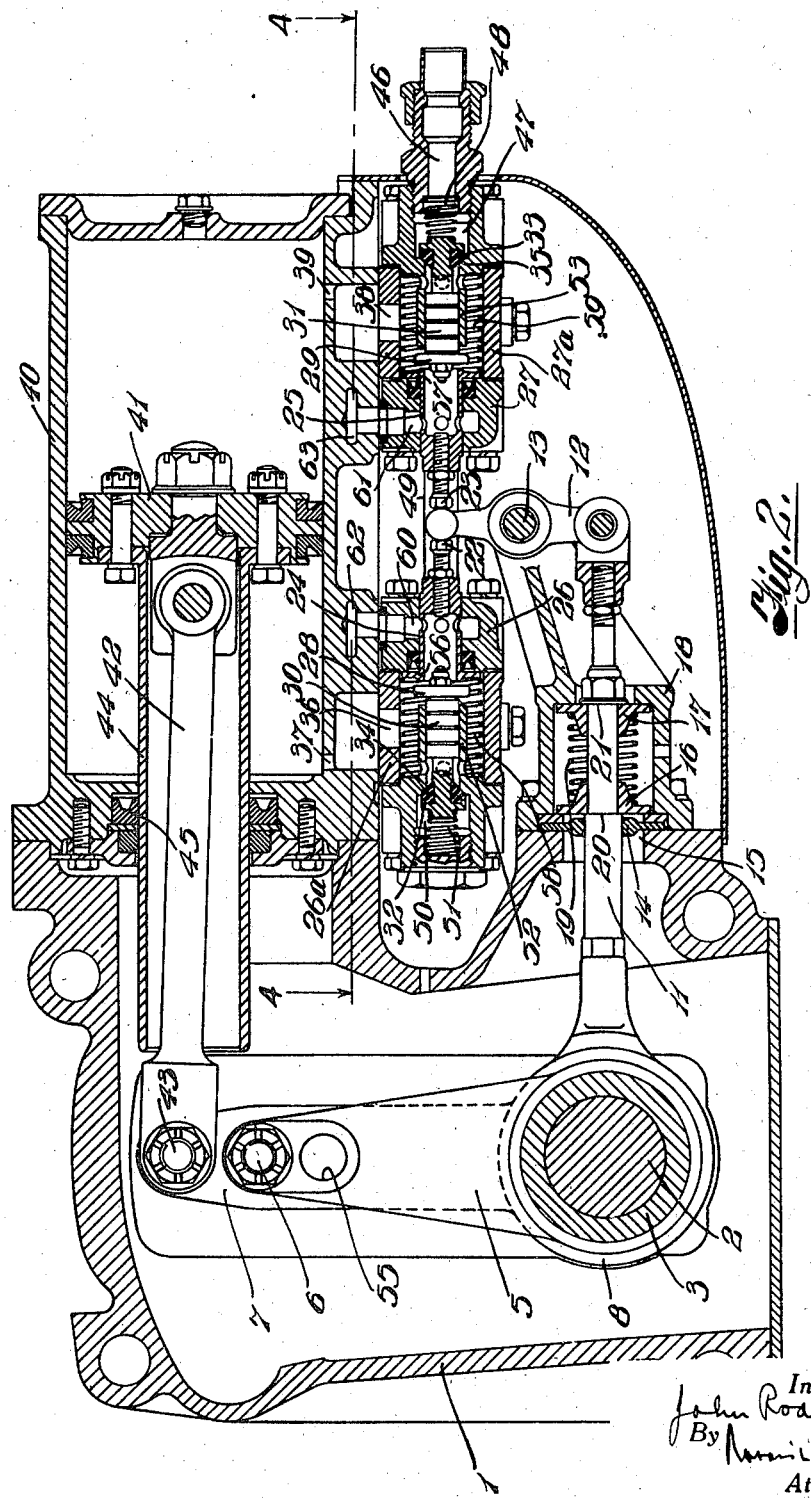
Fig. 2 is a sectional elevation taken in a plane at right angles to Fig. 1 showing the power actuating mechanism in the inoperative position.

When the parts are in the positions shown in Fig. 2 no steering movements take place as both sides of the piston 41 are open to atmosphere. This is due to the fact that both of the hollow ported rods 24 and 25 are out of contact with their respective seatings 28 and 29 so that there is free passage for air through the exhaust opening 64, passage 62, port 60, the hollow ported rod 24, the valve housing 26 and ports 36 and 37 to one end of the cylinder 40. The air entering through opening 64 also passes through passage 63, port 61, hollow ported rod 25, valve housing 27 and ports 38 and 39 to the opposite end of the cylinder 40.

Figure 3:
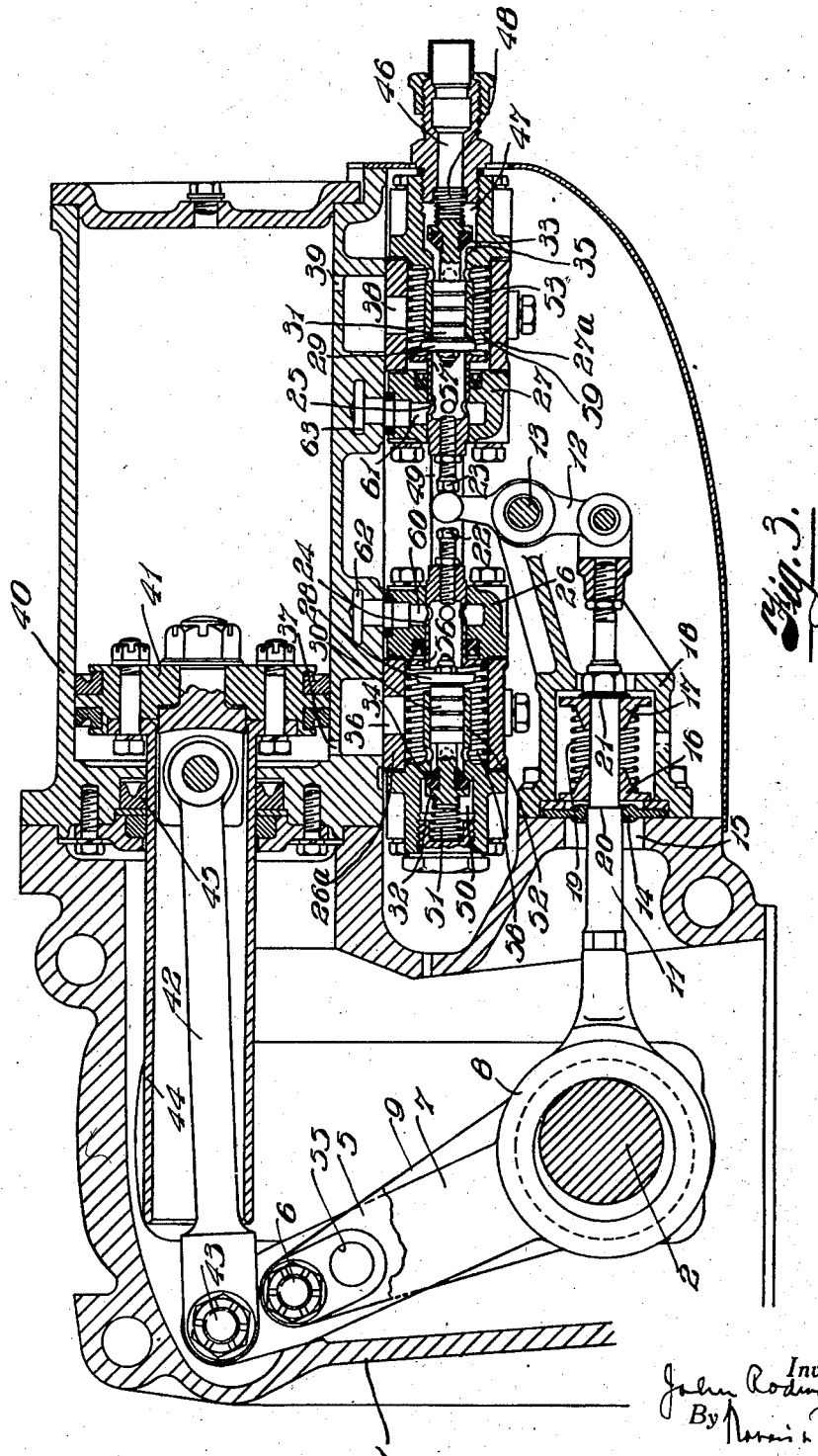
Fig. 3 is a view similar to Fig. 2 but showing the parts in an operative position and Fig. 4 is a sectional plan taken on the line 4—4 of Fig. 2.

In operation steering movements imparted to the hand steering wheel in the ordinary manner cause motion to be transmitted through arm 4 to the inner shaft 2 which rocks the arm 9. As this arm is connected by the pin 10 to the lever 7, the movement is also transmitted to that lever but as the movement of output lever 5 is opposed by the load and friction on the road wheels, the lever 7 rocks about pin 6 within the limits allowed by the annulus 8 which are sufficient to move the rod 11 and rocking lever 12 to actuate the one or the other of the valve tappets 22 or 23. The extreme amount of rocking movement which can be imparted in one direction is shown in Fig. 3 wherein the arm 12 is shown as having been rocked in a clockwise direction to operate the tappet 23 and move the hollow ported rod 25 into engagement with the seating 29 and impart sufficient axial movement to the valve stem 31 to move the valve member 33 off its seating 35. The interior of the housing 27 is thereby shut off from communication with the atmosphere because air can no longer pass through the hollow ported rod 25 and at the same time communication is established between the pressure fluid inlet 46 and the right-hand end of cylinder 40 the pressure fluid passing from the valve chamber 47 through the ports in the sleeve 53, through the housing 27 and ports 38 and 39 to the cylinder 40 to move the piston 41 towards the position shown in Fig. 3. During that movement air is exhausted from the opposite end of the cylinder 40 because the hollow ported rod 24 is still out of contact with its seating 28. The movement of the piston 41 is transmitted through rod 42 to the lever 7 and from thence through pin 6 and arm 5 to the output shaft 3 and the connection 54 to the steering gear of the road wheels. The power developed in the cylinder 40 thereby reacts on the lever 7 balancing it about the pin 6. The extent of the air pressure assistance is governed by the loads applied at the input pin 10 and the cylinder pin 43 balancing each other about the output pin 6 and this balancing action continues as the input load increases until the full available air pressure is being exerted in the cylinder 40, after which the air valve becomes open to its fullest extent and the cylinder pressure exerts a maximum and constant torque about the output shaft 3 to which is added the torque applied to the input shaft 2.

If the steering mechanism is operated in the reverse direction to that above indicated, the rocking lever 12 is moved in an anti-clockwise direction so that the hollow ported rod 24 makes contact with and moves its seating 28 to open the valve 32 and admit pressure fluid from the valve chamber 50 to the left-hand end of the cylinder 40. The piston 41 will then move towards the right hand end of cylinder 40, its movement being transmitted as before to the member 54 and thence to the steering gear of the road wheels.

As the rod 11 moves in either direction to rock the lever 12, one or other of the flanged collars 16 or 17 is also moved to compress the bias spring 19 as shown in Fig. 3 where the collar 17 has been moved away from the end wall of the casing 18. The primary purpose of the spring 19 is to damp out any tendency of the road wheels to cause continuous opening and closing of the valves contained in housings 26 and 27 and thereby set up "chatter."

The unit above described and illustrated will also act as a shock absorber as when a load is applied to the output shaft 3 by impact of the road wheels it is transmitted through the system comprising the arms 5 and 9 and lever 7 to one or other of the valve tappets 22 or 23 to open the appropriate valve and allow air to enter the power cylinder 40 on the side of the piston 41 opposing the direction of motion thereby cushioning the shock load.

The arrangement above described can be reversed in that the inner shaft 2 can constitute the output shaft while the outer shaft 3 can constitute the input shaft and the two arms 5 and 9 are drilled as shown in Fig. 1 at 55 and 55a to enable connections to be made to suit this arrangement.

It is to be understood that although the invention has been particularly described with reference to the use of compressed air as the source of power the device can also be arranged for vacuum operation. In such case it would be necessary, for example, to arrange that instead of admitting pressure fluid through the port 39 in cylinder 40 to move the piston to the position shown in Fig. 3, vacuum would have to be exerted through the port 37 at the opposite end of the said cylinder, the port 39 being meanwhile opened to atmosphere.

I claim:

1. In a power operated steering device for vehicles having a power operated member and control means therefor, inner and outer concentric input and output shafts carrying arms, a reaction lever pivotally connected at different points between its ends to said arms, one end of said lever having means for connecting it to the power operated member and the other end of said lever freely surrounding the inner shaft and having means for connecting it to the control means, said lever being movable by the arm on the input shaft about its connection to the arm on the output shaft in a direction to operate the control means to energize the power operated member and thereby cause movement to be transmitted through said lever to the output shaft and steering wheels of the vehicle, and said lever balancing about its pivotal connection to the output arm and thereby transmitting the reaction of the power operated member to the input shaft.

2. A power operated steering device according to claim 1, wherein said means for connecting said reaction lever to the control means comprises an annulus which freely surrounds said inner shaft and is connected to a rod for connecting it to the control means.

3. A power operated steering device according to claim 1, wherein said means for connecting said reaction lever to the control means comprises an annulus which freely surrounds said input shaft and is connected to a rod for connecting it to the control means, and including a bias spring device compressible by movement of said rod in either direction and operative to damp out tendency of said reaction lever to vibrate about its pivotal connections under the influence of the vehicle steering wheels.

4. In a power operated steering device having hand operated steering means and a power operated actuating member and control means therefor, a casing, an inner shaft and an output shaft sleeved thereover, said shafts being mounted rotatably in the casing, means on one of said shafts for connecting it to the hand operated steering means, means on the other shaft for connecting it to the road wheel steering gear, arms fixed to the ends of said shafts within said casing, a lever disposed between said arms and having means at one end for connecting it to the power operated actuating member, and having an annulus at its opposite end surrounding and spaced from the inner shaft, a pivotal connection between the arm of the inner shaft and said lever and a pivotal connection between said lever and the arm of the output shaft, the latter pivotal connection being disposed between the first-mentioned connection and the means for connecting said lever to the actuating member.

5. In a power operated steering device having hand steering mechanism and a power operated member and control means therefor, concentric input and output shafts having means for connecting them respectively to the hand steering mechanism and the road wheel steering gear, a casing in which said shafts are rotatably mounted, a reaction lever disposed betwen said arms and having means at one end for connecting it to the power operated member and provided at its opposite end with an annulus loosely surrounding the input shaft and having means for connecting it to the control means for the power operated member, pivotal connections between said lever and said arms disposed in eccentric positions thereon to transmit power from said actuating member through said lever to the output shaft while the reaction of such power transmission is exerted on the input shaft, said reaction lever being rockable about its pivotal connection to the output shaft to a balanced position to thereby bring said annulus to a position to interrupt operation of the power operated member.

6. A power operated steering device for vehicles having a power operated member for the vehicle wheels and control means for said member, comprising input and output arms having means for connecting them respectively to manual steering means and the vehicle steering wheels, a reaction lever pivotally connected to the input and output arms at closely adjacent points between its ends, one end of said lever having means for connecting it to the power operated member, and the other end of said lever having means for connecting it to the control means for the power operated member.

7. A power operated steering device according to claim 6, wherein said arms are fixed to ends of inner and outer shafts, and said reaction lever is interposed between said arms, and said means for connecting said arms to the manual steering means and the vehicle steering wheels are connected to the ends of said shafts opposite to the ends thereof to which said arms are fixed.

JOHN RODWAY.